United States Patent
Moschetti, Jr.

(10) Patent No.: US 9,641,533 B2
(45) Date of Patent: *May 2, 2017

(54) SYSTEM AND METHOD FOR TRUSTED PAIR SECURITY

(71) Applicant: JPMorgan Chase Bank, N.A., New York, NY (US)

(72) Inventor: Paul A. Moschetti, Jr., New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/800,886

(22) Filed: Jul. 16, 2015

(65) Prior Publication Data

US 2015/0326573 A1 Nov. 12, 2015

Related U.S. Application Data

(63) Continuation of application No. 13/323,277, filed on Dec. 12, 2011, now Pat. No. 9,225,719.

(51) Int. Cl.
*H04L 9/32* (2006.01)
*H04L 29/06* (2006.01)
*H04L 9/08* (2006.01)

(52) U.S. Cl.
CPC ............ *H04L 63/10* (2013.01); *H04L 9/0819* (2013.01); *H04L 9/3273* (2013.01); *H04L 63/0457* (2013.01); *H04L 63/08* (2013.01); *H04L 63/0869* (2013.01); *H04L 63/0209* (2013.01); *H04L 63/0435* (2013.01)

(58) Field of Classification Search
CPC ...... H04L 63/10; H04L 63/08; H04L 63/0209
USPC .......................................................... 713/169
See application file for complete search history.

(56) References Cited

U.S. PATENT DOCUMENTS

| | | | |
|---|---|---|---|
| 7,681,229 B1 * | 3/2010 | Ebrahimi | H04L 63/0281 709/229 |
| 2010/0173673 A1 * | 7/2010 | Lydon | G06F 21/44 455/557 |
| 2011/0145910 A1 * | 6/2011 | Barnes | H04L 63/0263 726/12 |

FOREIGN PATENT DOCUMENTS

| WO | WO 2009045895 | 4/2009 |
|---|---|---|
| WO | WO 2010027694 | 3/2010 |

OTHER PUBLICATIONS

Amitabh Saxena; Authenticating Mobile Agent Platforms Using Signature Chaining Without Trusted Third Parties; IEEE; year:2005; page.*

European Search Report, Jul. 31, 2015.

* cited by examiner

*Primary Examiner* — Monjour Rahim
(74) *Attorney, Agent, or Firm* — Hunton & Williams LLP (57) ABSTRACT

A system for and method of protecting a resource is presented. The system and method include a trusted pair consisting of an initiator and a receiver. The receiver faces outward and is connected to a network, such as the Internet. The initiator is connected to the protected resource. In establishing a connection between the initiator and the receiver, the initiator initiates all communications. This configuration simplifies environment management, improves security including access controls, and facilitates deployment of internet-facing resources by changing the traditional model of component-to-component connection.

20 Claims, 9 Drawing Sheets

SYSTEM AND METHOD FOR TRUSTED PAIR SECURITY

RELATED PATENT APPLICATIONS

This application is a continuation of U.S. patent application Ser. No. 13/323,277 filed Dec. 12, 2011, the disclosure of which is incorporated herein by reference in its entirety.

BACKGROUND OF THE INVENTION

1. Field of the Invention

The present invention generally relates to Internet security, and, more particularly, to a system and method for trusted pair security.

2. Description of the Related Art

Firewalls are used in computer networks to permit or deny network transmissions based upon a set of rules. They are frequently used to protect networks from unauthorized access while permitting legitimate communications to pass.

There are at least two problems with firewalls. First, as the number of outward-facing applications grows, the complexity of correctly managing firewalls becomes intractable. Human error will creep into any sufficiently complex system, and firewalls tend to include a lot of complexity in their management. The errors will likely take the form of accidental openings to the system through the firewall. Second, typical de-militarized zone ("DMZ") system architecture makes it difficult to deploy or change applications due to substantially increased access restrictions in the zone itself.

SUMMARY OF THE INVENTION

A system and method for trusted pair security is disclosed. According to one embodiment, the method may include (1) providing a receiver, the receiver comprising a computer processor, the receiver being communicatively coupled to a network; (2) providing an initiator, the initiator comprising a computer processor, the initiator being communicatively coupled to the resource, the initiator further being communicatively coupled to the receiver; (3) sending, from the initiator to the receiver, a first authentication request on a first port, the first authentication request comprising a parameter shared between the receiver and the initiator; (4) sending, from the receiver to the initiator, an identification of a second port; (5) sending, from the initiator to the receiver, a second authentication request on the second port; (6) mutually authenticating the initiator and the receiver via the second port; and (7) establishing a streaming connection between the initiator and the receiver over the second port.

The method may further include (8) receiving, at the receiver, a request for the resource over the network from a requestor; (9) determining, by the receiver, that the initiator is operatively coupled to the resource; (10) passing, by the receiver, the request to the initiator over the second port via the streaming connection; (11) passing, by the initiator, the request to the resource; (12) conveying, by the initiator, a response from the resource to the receiver over the second port via the streaming connection; and (13) sending, from the receiver, the response to the request to the requestor. In one embodiment, further communications between the requestor and the resource pass through the initiator and the receiver over the second port via the streaming connection.

In one embodiment, prior to the sending, from the initiator to the receiver, a first authentication request on a first port, the method may include (a) receiving, at the receiver, a request for the resource over the network from a requestor; (b) determining, by the receiver, the absence of a streaming connection between the initiator and the receiver; and (c) sending, by the receiver, an error message to the requestor.

The method may also include, prior to the sending, from the initiator to the receiver, a first authentication request on a first port (d) determining, by the receiver, that the initiator is communicatively coupled to the resource, and the error message may include a human readable invitation to access the resource at a future time.

The method may also include, prior to the sending, from the initiator to the receiver, a first authentication request on a first port (e) storing in a persistent memory of the receiver an identification of the resource. The determining, by the receiver, that the initiator is communicatively coupled to the resource may include accessing the identification of the resource in the persistent memory of the receiver. The second authentication request may include the identification of the resource.

In one embodiment, prior to the sending, from the initiator to the receiver, a first authentication request on a first port, the method may include (a) sending, from the initiator to the receiver, an identification of the resource; and (b) storing in a persistent memory of the receiver the identification of the resource. The determining, by the receiver, that the initiator is communicatively coupled to the resource may include the receiver accessing the identification of the resource in the persistent memory of the receiver.

The method may also include providing a resource identification server communicatively coupled to the initiator and to the receiver. The determining, by the receiver, that the initiator is communicatively coupled to the resource may include the receiver accessing the resource identification server.

The method may also include the steps of detecting, by the receiver, an attack; and severing the streaming connection in response to the detecting.

In another embodiment, a system for protecting a resource is disclosed. According to one embodiment, the system discloses a receiver comprising a computer processor, the receiver being communicatively coupled to a network; an initiator, the initiator comprising a computer processor, the initiator being communicatively coupled to the resource, the initiator further being communicatively coupled to the receiver.

The initiator may be configured to send, to the receiver, a first authentication request on a first port, and the first authentication request may include a parameter shared between the receiver and the initiator.

The receiver may be configured to send, to the initiator, an identification of a second port.

The initiator may be configured to send, to the receiver, a second authentication request on the second port.

The initiator and receiver may be configured to mutually authenticate via the second port, and the initiator and receiver may be configured to establish a streaming connection between the initiator and the receiver over the second port.

The receiver may be configured to receive a request for the resource over the network from a requestor and determine that the initiator is operatively coupled to the resource, and may be configured to pass the request to the initiator over the second port via the streaming connection.

The initiator may be configured to pass the request to the resource and convey a response from the resource to the receiver over the second port via the streaming connection.

The receiver may be configured to send the response to the request to the requestor.

Further communications between the requestor and the resource may pass through the initiator and the receiver over the second port via the streaming connection.

In one embodiment, prior to the first authentication request, the system may be configured to receive, at the receiver, a request for the resource over the network from a requestor; determine, by the receiver, the absence of a streaming connection between the initiator and the receiver; and send, by the receiver, an error message to the requestor.

In one embodiment, the receiver may be further configured to, prior to the first authentication request, determine that the initiator is communicatively coupled to the resource, wherein the error message comprises a human readable invitation to access the resource at a future time.

In one embodiment, the receiver may be further configured to store, prior to the first authentication request, an identification of the resource.

In one embodiment, the second authentication request may include the identification of the resource.

In one embodiment, prior to the first authentication request, the system may be configured to send, from the initiator to the receiver, an identification of the resource; and store in a persistent memory of the receiver the identification of the resource. The receiver may be further configured to access the identification of the resource in the persistent memory of the receiver.

In one embodiment, the system may further include a resource identification server communicatively coupled to the initiator and to the receiver. The receiver may be configured to access the resource identification server.

In one embodiment, the receiver may be further configured to detect an attack and sever the streaming connection in response to the attack.

According to another embodiment, a method for establishing a streaming connection between an initiator and a receiver, may include (1) receiving, at a first port for a receiver comprising a computer processor, a request for a streaming communication, the request comprising a first authentication protocol; (2) determining, based on the first authentication protocol, that the initiator is likely to be authentic; (3) using the computer processor, determining a second port for a streaming connection; (4) communicating, over the first port, an identification of the second port to the initiator; (5) dropping the connection at the first port; (6) opening the second port; (7) listening for a communication from the initiator at the second port; and (8) closing the second port if the communication from the initiator is not received within a predetermined time period.

The step of determining a second port for a streaming connection may further include randomly selecting the second port.

The method may further include (8) authenticating the initiator with a second authentication protocol; and (9) establishing a dedicated link for the streaming connection between the initiator and the receiver.

BRIEF DESCRIPTION OF THE DRAWINGS

The present invention, together with further objects and advantages, may best be understood by reference to the following description taken in conjunction with the accompanying drawings, in the several figures of which like reference numerals identify like elements, and in which.

DETAILED DESCRIPTION OF PREFERRED EMBODIMENTS

Several embodiments of the present invention and their advantages may be understood by referring to FIGS. 1-9, wherein like reference numerals refer to like elements.

Figure 1:
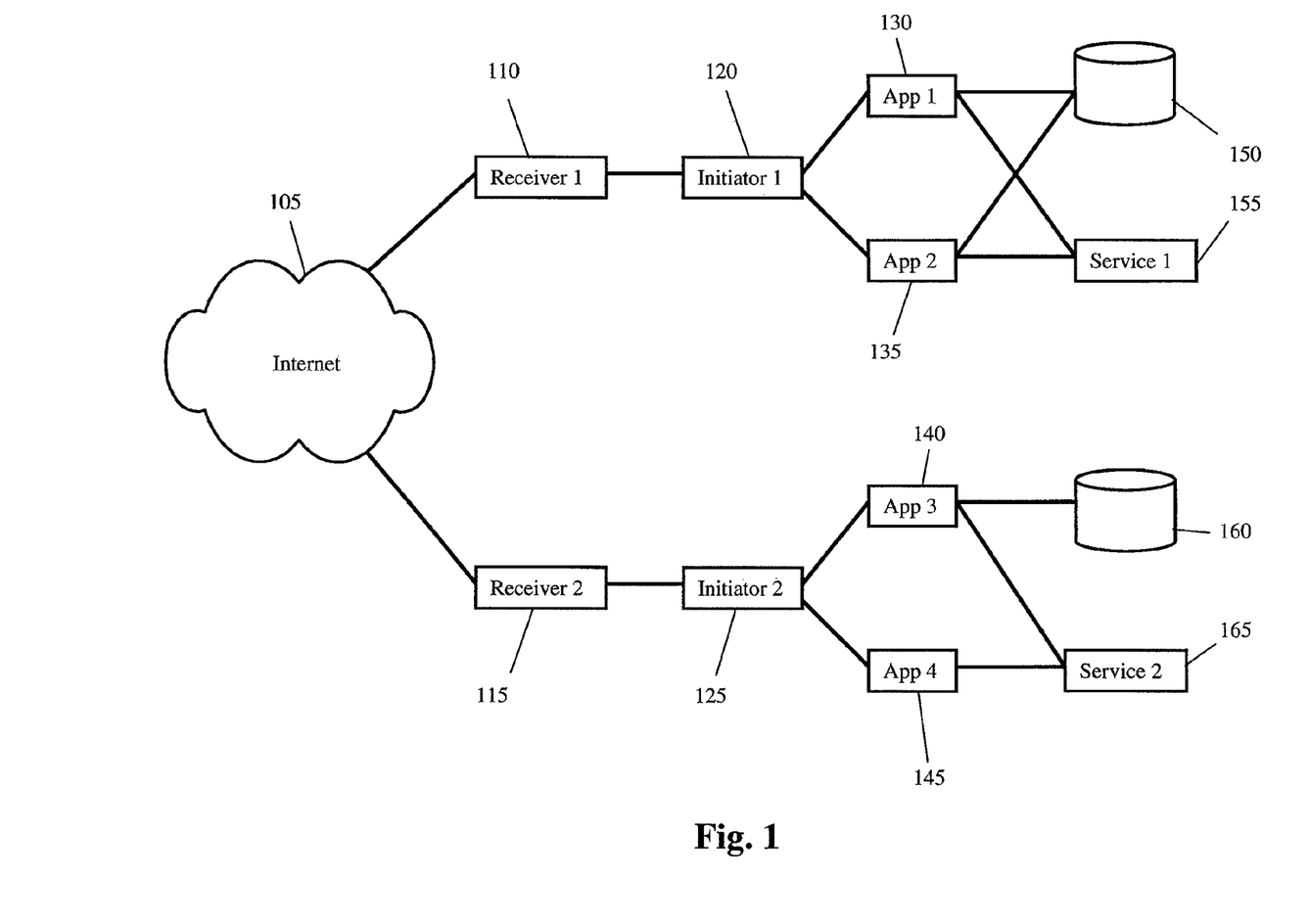
FIG. 1 is a schematic diagram illustrating a system according to an embodiment of the present invention.

FIG. 1 is a schematic diagram illustrating a system according to an embodiment of the present invention. According to one embodiment, the system may include receiver 110 (and 115) and initiator 120 (and 125). Receivers 110, 115 and initiators 120, 125 may be embodied in computer-executable software, computer hardware, computer firmware, or any suitable combination thereof.

Receivers 110, 115 may be outward-facing and may be configured to "listen" on ports that are open to network 105, such as the Internet, such as standard ports like port 8080. Receivers 110, 115 may be in the DMZ or other less-trusted zone. Initiators 120, 125 may not have any direct connection to Internet 105. Instead, initiators 120, 125 may reside inside the firewall or in another trusted zone.

Initiators 120, 125 may be connected to applications 130, 135, 140, 145 that are protected from the Internet. Each application may be connected to servicers 155, 165 and to persistent storage 150, 160. Applications 130, 135, 140, 145 may be, by way of non-limiting example, customer account applications (e.g., electronic banking applications), bill payment applications, applications that allow users to apply for products or services (e.g., loan application software), or electronic commerce applications (e.g., an electronic store). In general, embodiments may include a single receiver/initiator pair, a single receiver with a plurality of initiators, or a single initiator with a plurality of receivers.

Figure 2:
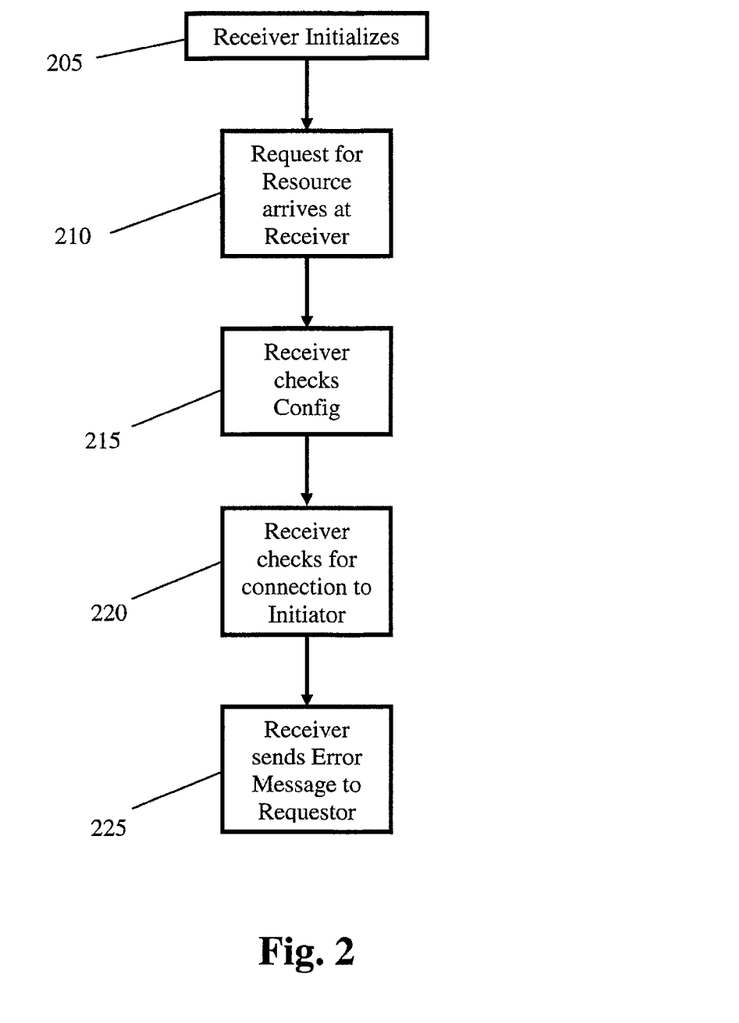
FIG. 2 is a flow chart illustrating an attempted user interaction according to an embodiment of the present invention.

FIG. 2 is a flow chart illustrating an attempted user interaction according to an embodiment of the present invention. At block 205, the receiver initializes. This may include the receiver powering on, restarting or otherwise re-setting itself.

At block 210, the receiver receives a request for a resource from a user over the internet.

At block 215, the receiver may check its settings to determine which resources it can provide once it is successfully paired with an initiator. In one embodiment, the receiver may check its "config" settings. A "config" may simply be a set of parameters that may control the behavior of the receiver and initiator pair. Those parameters could be realized in a variety of physical formats (for example, in XML, JSON, name-value, etc) and may be persisted in a variety of ways (file, non-volatile RAM, ROM, even as a transient message on messaging subsystem such as TIBCO EMS, SonicMQ, or IBM MQ, etc.). The config may be internal or external to the receiver. Techniques for supplying the receiver with the config are discussed below in reference to FIGS. 5-8.

If the requested resource is not listed in config, the receiver replies with an error message. The error message may convey to the user that the resource is not available and that the user should not expect the resource to be available.

If the requested resource is listed in config, in block 220 the receiver checks whether it is paired with an initiator that can provide the requested resource. The process discussed in reference to FIG. 2 assumes that no such pairing yet exists, thus, at block 220, the receiver determines that it has not paired with an initiator that can provide the requested resource.

At block 225, the receiver sends an error message to the requesting user, such as "resource not currently available." In one embodiment, the error message may be more detailed and/or intelligent than a simple HTTP Standard Response Code 404 (i.e., a "not found" message). Indeed, the message could be customized to say, e.g., "please try again in 15 minutes." (This assumes that the receiver determined at block 215 that it can connect to the initiator that connects to the requested resource. If the receiver does not recognize the resource at all, it can respond with a more standard "not found" error message).

Figure 3:
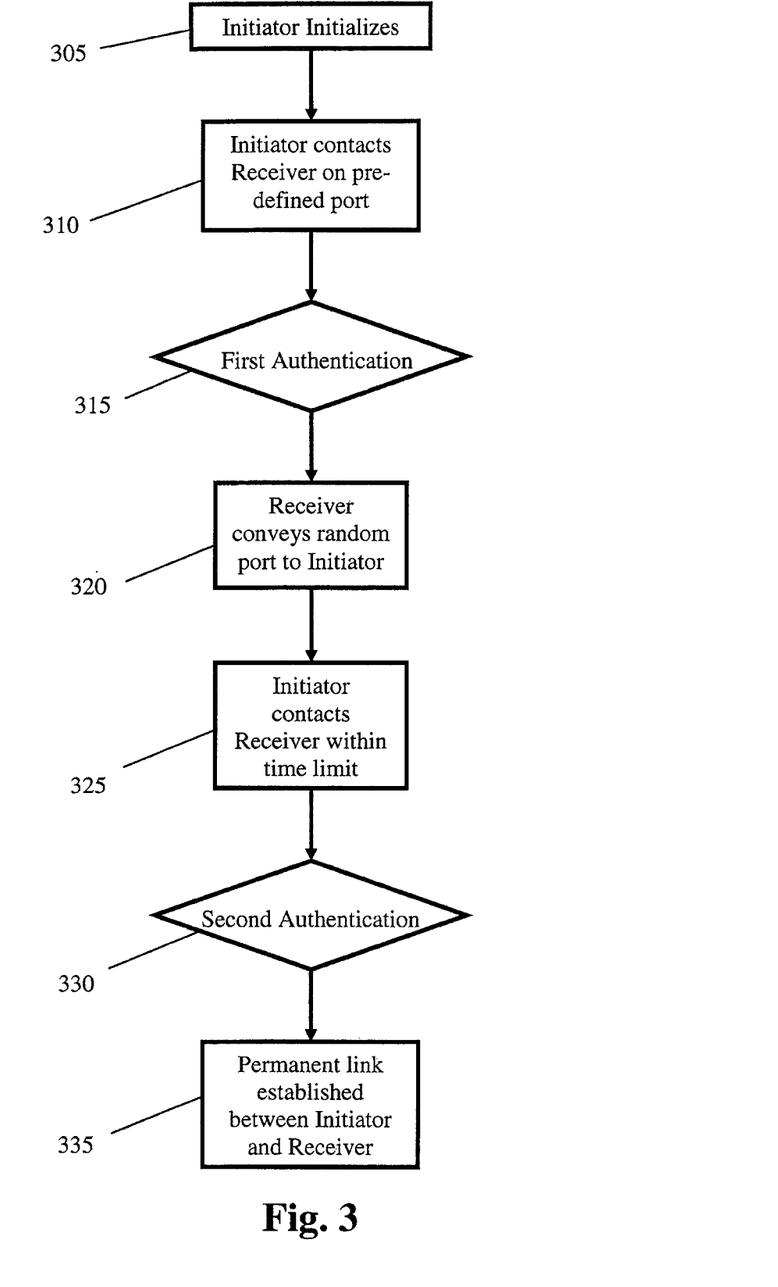
FIG. 3 is a flow chart illustrating a set up operation according to an embodiment of the present invention.

FIG. 3 is a flow chart illustrating a set up operation according to an embodiment of the present invention. At block 305, the initiator initializes. This may comprise powering up, restarting, or otherwise resetting itself. At block 310, the initiator communicates with a receiver to establish a communication link. In one embodiment, this communication link to be established may be a dedicated, permanent link. Thus, in one embodiment, both the initiator and the receiver may include or have access to the same authentication mechanism, such as a symmetric cryptographic key. This key may be hard coded into each so that there is no need for a key transportation mechanism.

The receiver, which is assumed for the purposes of FIG. 3 to have already initialized, listens on a port. In one embodiment, this port may be a pre-defined port, which may be referred to as the "hailing port." In one embodiment, the receiver may only listen on the hailing port; in another embodiment, the receiver may listen on multiple ports. When the initiator communicates with the receiver, the initiator contacts the hailing port.

At block 315, the initial contact at the hailing port may include a lightweight authentication protocol. By way of non-limiting example, the initiator may send a hash of the time and date encrypted using the shared key to the receiver. If the receiver can decrypt the hash and match it to a hash that it itself generates, then the initiator is judged to be potentially authentic and the process can proceed. If not, the connection is dropped.

The lightweight authentication protocol helps mitigate denial-of-service attacks by not allowing the hailing port to remain busy for too long.

In one embodiment, the initiator and receiver may continue the connection using the hailing port. In another embodiment, the initiator and receiver may agree to continue the communication on another port, such as a dynamically opened port. In one embodiment, the receiver may select a new port at random (e.g., port 48000) and convey the identity of that port to the initiator at block 320. The receiver then drops the connection on its hailing port and begins listening on the new port selected by the receiver.

In block 325, the initiator may contact the receiver. Unless the initiator makes appropriate contact with the receiver within a specified time interval (e.g., 0.5 seconds, one second, two seconds, or whatever time period is necessary and/or desired) this port "times out" and closes. Thus, if an attacker happens to attack port 48000 during this brief interval, not only will the attack fail, but if the attacker returns, he will find the port closed.

At block 330, the communications at the new port may next proceed with a more heavyweight authentication protocol. In one embodiment, this authentication protocol may include a nonce exchange using an asymmetric key pair. At block 335, once the receiver and initiator are authenticated to each-other on the dynamic port, they may proceed to establish a dedicated link between them. This double authentication with the hailing and dynamic ports creates a trusted initiator/receiver pair. The link may be a bit-bucket-brigade, streaming, unblocking connection.

In one embodiment, the dedicated link between the receiver and initiator may be temporary, semi-permanent, or permanent. In one embodiment, the link may time out after the passage of a predetermined amount of time, data, etc.

In one embodiment, the initiator may be required to re-authenticate itself randomly, or periodically, or as necessary and/or desired.

In any embodiment, the link between the initiator and the receiver may be immediately severed if an attack is detected by the receiver or any other component. This immediately isolates the resource from the Internet.

Figure 4:
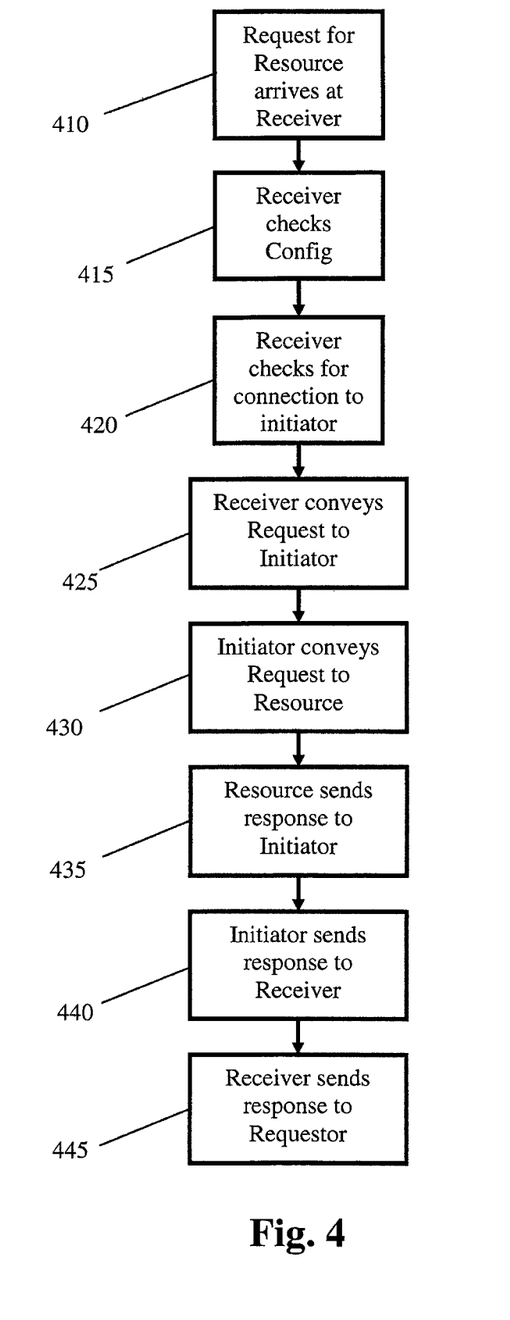
FIG. 4 is a flow chart illustrating a successful user interaction according to an embodiment of the present invention.

FIG. 4 is a flow chart illustrating a successful user interaction according to an embodiment of the present invention. The process illustrated in FIG. 4 assumes that the initiator and receiver have already established a permanent link between them as discussed above in reference to FIG. 3.

At block 410, a request for a resource is received over the Internet via standard http protocol. In one embodiment, the request may be routed to a well known port on the receiver, such as port 8080.

At block 415, the receiver may check its config to determine whether it might be paired with an initiator that can provide the resource. If not, the process may terminate with an error message as discussed above in reference to FIG. 3. If so, the process proceeds to block 420.

In block 420, the receiver may check whether it has an existing trusted pairing with the initiator that can provide the requested resource. If no such pairing exists, in one embodiment, the receiver immediately drops the connection. In another embodiment, the receiver may take an appropriate action to disable communication via the connection. In still another embodiment, the receiver may send a communication to the initiator that the initiator is not authenticated, that the requested resource is not requested, etc.

If the receiver is paired with an initiator (as discussed above in reference to FIG. 3), at block 425, the receiver may pass the information to the initiator over the dynamically established port.

At block 430, the initiator may pass the request to the requested resource, and, at block 435, the resource, in turn, may pass its response back to the initiator. At block 440, the initiator passes the response on to the receiver. At block 445, the receiver passes the response to the end user. The end user and the resource may continue to communicate—effectively transparently and safely—through the receiver/initiator pair.

Figure 5:
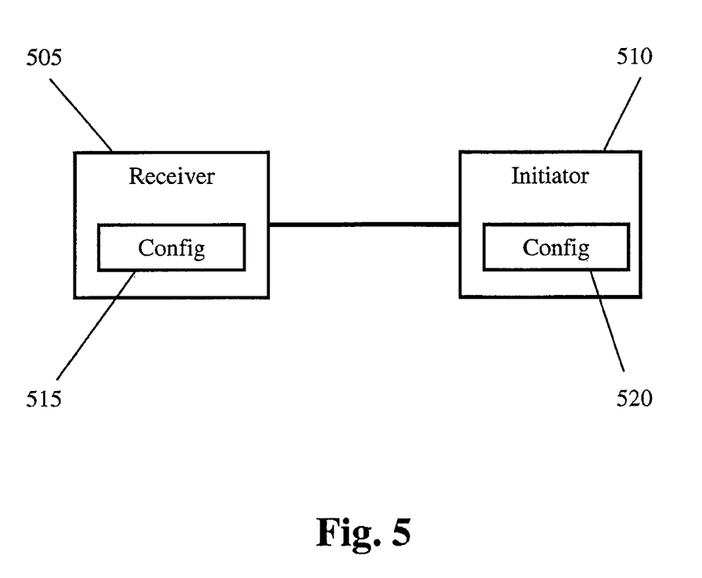
FIG. 5 is a schematic diagram illustrating a first exemplary configuration arrangement according to an embodiment of the present invention.

FIG. 5 is a schematic diagram illustrating a first exemplary configuration arrangement according to an embodiment of the present invention. In the embodiment of FIG. 5, both receiver 505 and initiator 510 include hard-coded copies of the config 515, 520. In this arrangement, there is no need to convey the config to the receiver or initiator once the config has been coded. The release control dynamics of this arrangement are similar to releasing an application into the DMZ in a traditional architecture.

Figure 6:
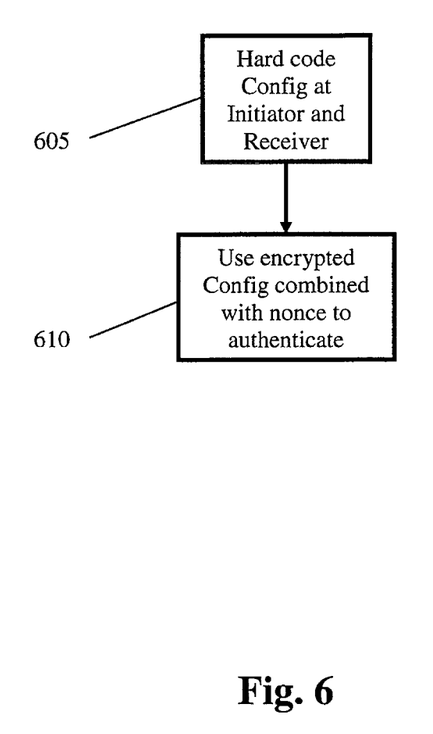
FIG. 6 is a flow chart illustrating a first exemplary configuration operation according to an embodiment of the present invention.

FIG. 6 is a flow chart illustrating a first exemplary configuration operation according to an embodiment of the present invention. In one embodiment, the process of FIG. 6 may be implemented using the arrangement described above in reference to FIG. 5, or any other arrangement as necessary and/or desired.

At block 605, the initiator and receiver may each obtain hard-coded copies of the config by, for example, manual installation by a human administrator. The config may be provide in any suitable way, including through the secure communication link, on a token, thumb drive, via wireless communication, by email, or by any mechanism as necessary and/or desired. In another embodiment, config may be hardcoded into the initiator and/or receiver.

At block 610, and as part of an initial authentication (e.g., block 315 of FIG. 3), the initiator may combine the resource description (e.g., the config itself or a hash thereof) with a nonce and encrypts it. The receiver may decrypt the message and verify the resource description matches its own hard-coded data. The receiver may return the decrypted nonce or other evidence of its ability to decrypt the original message.

In one embodiment, a verification of this return message may complete the initial authentication.

Figure 7:
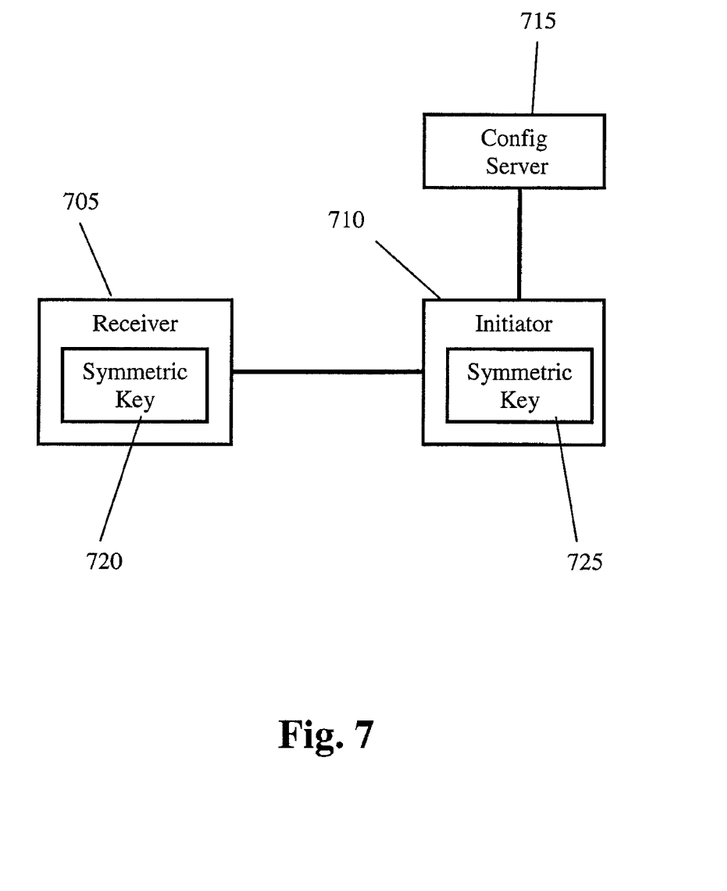
FIG. 7 is a schematic diagram illustrating a second exemplary configuration arrangement according to an embodiment of the present invention.

FIG. 7 is a schematic diagram illustrating a second exemplary configuration arrangement according to an embodiment of the present invention. In this arrangement, initiator 710 may be communicatively coupled to server 715 which can vend a config. Receiver 705 and initiator 710 may not have hard-coded configs in this arrangement; they may only have the shared symmetric key 720, 725.

Figure 8:
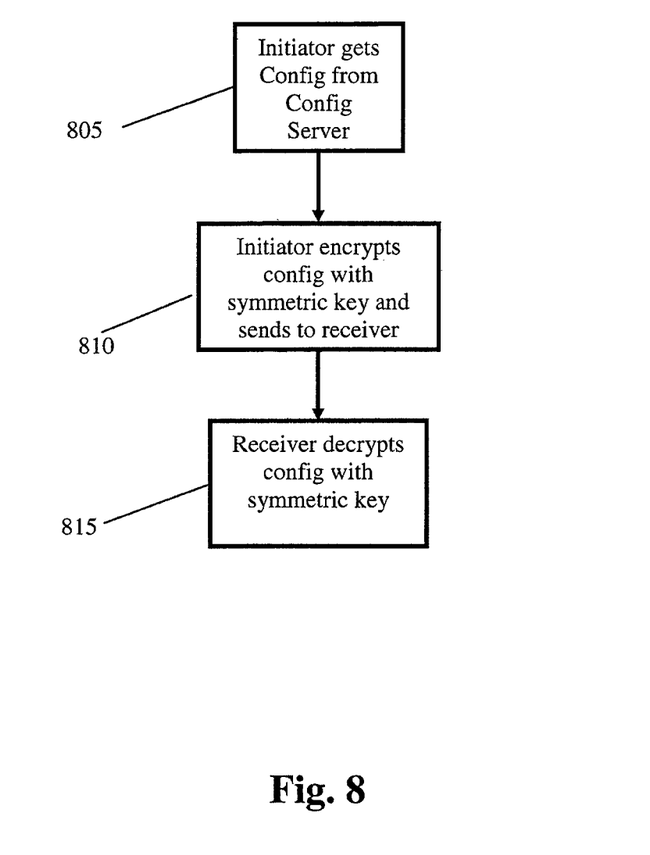
FIG. 8 is a flow chart illustrating a second exemplary configuration operation according to an embodiment of the present invention.

Following the establishment of the permanent link between receiver and initiator (block 335 of FIG. 3) the initiator may send the config vended from server 715 to the receiver FIG. 8 is a flow chart illustrating a second exemplary configuration operation according to an embodiment of the present invention. The process of FIG. 8 may be implemented using, for example, the arrangement described above in reference to FIG. 7.

At block 805 in this arrangement, the initiator-connected server may provide a list of resources to the initiator. Alternately, the initiator may already include a list of resources. In either case, at block 810 the initiator may encrypt encrypts config with, for example, the symmetric key and may transmit the encrypted config to the receiver. This may be done, for example, at start-up.

At block 815, the receiver may decrypt config with symmetric key.

Figure 9:
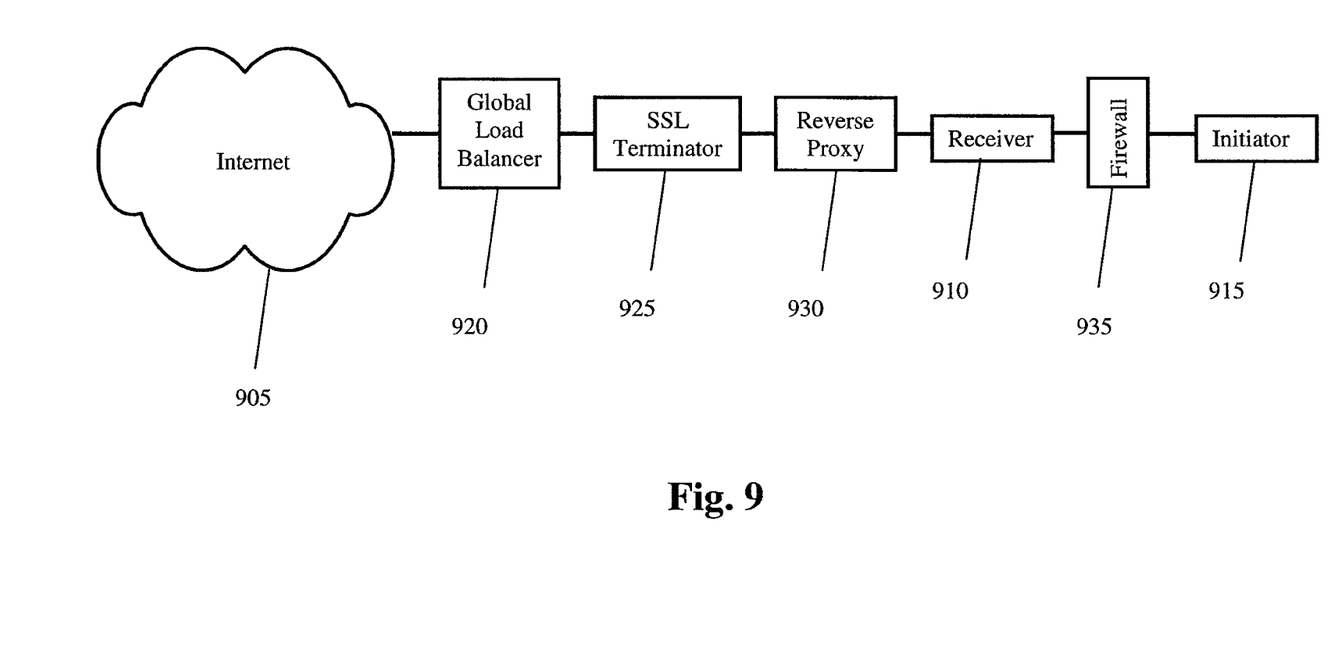
FIG. 9 is a schematic diagram illustrating possible additional components according to an embodiment of the present invention.

FIG. 9 is a schematic diagram illustrating possible additional components according to an embodiment of the present invention. In FIG. 9, several optional performance, security, or resilience-related components may sit between Internet 905 and receiver 910, which is coupled to initiator 915. Such components may include any, or a combination, of global load balancer 920, SSL terminator 925, reverse proxy server 930 and firewall 935. Other components, such as application firewalls, email-borne malware scanning appliances or software, other bitstream scanning appliances or software, etc. may be provided as necessary and/or desired.

It is to be appreciated that the set of instructions, such as the software that configures the computer operating system to perform the operations described above, may be contained on any of a wide variety of media or medium, as desired. Further, any data that is processed by the set of instructions might also be contained on any of a wide variety of media or medium. That is, the particular medium, that is, the memory in the processing machine, utilized to hold the set of instructions or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by a computer.

In the preceding specification, various preferred embodiments have been described with references to the accompanying drawings. It will, however, be evident that various modifications and changes may be made thereto, and additional embodiments may be implemented, without departing from the broader scope of invention as set forth in the claims that follow. The specification and drawings are accordingly to be regarded in an illustrative rather than restrictive sense.

We claim:

1. A method for protecting a resource, the method comprising:
   providing a receiver, the receiver comprising a computer processor, the receiver being communicatively coupled to a network and having a plurality of receiver ports;
   providing an initiator, the initiator comprising a computer processor, the initiator being communicatively coupled to the receiver through at least two receiver ports;
   sending, from the initiator to the receiver, a first authentication request on a first receiver port;
   sending, from the receiver to the initiator, an identification of a second receiver port;
   sending, from the initiator to the receiver, a second authentication request on the second receiver port;
   mutually authenticating the initiator and the receiver via the second receiver port; and
   establishing a streaming connection between the initiator and the receiver over the second receiver port.

2. The method of claim 1, further comprising:
   receiving, at the receiver, a request for a resource over the network from a requestor;
   determining, by the receiver, that the initiator is operatively coupled to the resource;
   passing, by the receiver, the request to the initiator over the second receiver port via the streaming connection;
   passing, by the initiator, the request to the resource;
   conveying, by the initiator, a response from the resource to the receiver over the second receiver port via the streaming connection; and
   sending, from the receiver, the response to the request to the requestor;
   whereby further communications between the requestor and the resource pass through the initiator and the receiver over the second receiver port via the streaming connection.

3. The method of claim 1, further comprising, prior to the sending, from the initiator to the receiver, a first authentication request on a first receiver port:
   receiving, at the receiver, a request for a resource over the network from a requestor;
   determining, by the receiver, the absence of a streaming connection between the initiator and the receiver; and
   sending, by the receiver, an error message to the requestor.

4. The method of claim 3, further comprising, prior to the sending, from the initiator to the receiver, a first authentication request on a first receiver port:
   determining, by the receiver, that the initiator is communicatively coupled to the resource;
   wherein the error message comprises a human readable invitation to access the resource at a future time.

5. The method of claim 4, further comprising, prior to the sending, from the initiator to the receiver, a first authentication request on a first receiver port:
   storing in a persistent memory of the receiver an identification of the resource;
   wherein the determining, by the receiver, that the initiator is communicatively coupled to the resource comprises accessing the identification of the resource in the persistent memory of the receiver.

6. The method of claim 5, wherein the second authentication request comprises the identification of the resource.

7. The method of claim 4, further comprising, prior to the sending, from the initiator to the receiver, a first authentication request on a first receiver port:
   sending, from the initiator to the receiver, an identification of the resource; and
   storing in a persistent memory of the receiver the identification of the resource;
   wherein the determining, by the receiver, that the initiator is communicatively coupled to the resource comprises the receiver accessing the identification of the resource in the persistent memory of the receiver.

8. The method of claim 4, further comprising:
   providing a resource identification server communicatively coupled to the initiator and to the receiver;
   wherein the determining, by the receiver, that the initiator is communicatively coupled to the resource comprises the receiver accessing the resource identification server.

9. The method of claim 1, further comprising:
   detecting, by the receiver, an attack; and
   severing the streaming connection in response to the detecting.

10. A system for protecting a resource, the system comprising:
   a receiver comprising a computer processor, the receiver being communicatively coupled to a network and having a plurality of receiver ports;
   an initiator, the initiator comprising a computer processor, the initiator being communicatively coupled to the resource, the initiator further being communicatively coupled to the receiver through at least two receiver ports;
   wherein the initiator is configured to send, to the receiver, a first authentication request on a first receiver port;
   wherein the receiver is configured to send, to the initiator, an identification of a second receiver port;
   wherein the initiator is configured to send, to the receiver, a second authentication request on the second receiver port;
   wherein the initiator and receiver are configured to mutually authenticate via the second receiver port;
   wherein the initiator and receiver are configured to establish a streaming connection between the initiator and the receiver over the second receiver port;
   wherein the receiver is configured to receive a request for the resource over the network from a requestor and determine that the initiator is operatively coupled to the resource;
   wherein the receiver is configured to pass the request to the initiator over the second receiver port via the streaming connection;
   wherein the initiator is configured to pass the request to the resource and convey a response from the resource to the receiver over the second receiver port via the streaming connection; and
   wherein the receiver is configured to send the response to the request to the requestor;
   whereby further communications between the requestor and the resource pass through the initiator and the receiver over the second receiver port via the streaming connection.

11. The system of claim 10, further configured to, prior to the first authentication request:
   receive, at the receiver, a request for the resource over the network from a requestor;
   determine, by the receiver, the absence of a streaming connection between the initiator and the receiver; and
   send, by the receiver, an error message to the requestor.

12. The system of claim 11, wherein the receiver is further configured to, prior to the first authentication request, determine that the initiator is communicatively coupled to the resource, wherein the error message comprises a human readable invitation to access the resource at a future time.

13. The system of claim 12, wherein the receiver is further configured to store, prior to the first authentication request, an identification of the resource.

14. The system of claim 13, wherein the second authentication request comprises the identification of the resource.

15. The system of claim 12, further configured to, prior to the first authentication request:
   send, from the initiator to the receiver, an identification of the resource; and
   store in a persistent memory of the receiver the identification of the resource;
   wherein the receiver is further configured to access the identification of the resource in the persistent memory of the receiver.

16. The system of claim 12, further comprising:
   a resource identification server communicatively coupled to the initiator and to the receiver;
   wherein the receiver is further configured to access the resource identification server.

17. The system of claim 10, wherein the receiver is further configured to detect an attack and sever the streaming connection in response to the attack.

18. A method for establishing a streaming connection between an initiator and a receiver, comprising:
   receiving, at a first receiver port for a receiver comprising a computer processor and having a plurality of receiver ports, a request for a streaming communication from an initiator, the request comprising a first authentication protocol;
   determining, based on the first authentication protocol, that the initiator is likely to be authentic;
   using the computer processor, determining a second receiver port for a streaming connection;
   communicating, over the first receiver port, an identification of the second receiver port to the initiator;

dropping the connection at the first receiver port;
opening the second receiver port;
listening for a communication from the initiator at the second receiver port; and
closing the second receiver port if the communication from the initiator is not received within a predetermined time period.

19. The method of claim 18, wherein the step of determining a second receiver port for a streaming connection comprises:
randomly selecting the second receiver port.

20. The method of claim 18, further comprising:
authenticating the initiator with a second authentication protocol; and
establishing a dedicated link for the streaming connection between the initiator and the receiver.

* * * * *